US010811144B2

(12) United States Patent
Laberge et al.

(10) Patent No.: US 10,811,144 B2
(45) Date of Patent: Oct. 20, 2020

(54) SYSTEM AND METHOD FOR PLASMA GENERATION AND COMPRESSION (71) Applicant: General Fusion Inc., Burnaby (CA)

(72) Inventors: Michel Georges Laberge, West Vancouver (CA); Meritt Wayne Reynolds, New Westminster (CA); Alexander Douglas Mossman, Vancouver (CA); Stephen James Howard, Burnaby (CA); Blake Kenton Rablah, North Vancouver (CA); Peter Joseph Larkin O'Shea, Burnaby (CA); Donald James Froese, North Vancouver (CA); Charles Beaufort Eyrich, Vancouver (CA)

(73) Assignee: General Fusion Inc., British Columbia (CA)

( * ) Notice: Subject to any disclaimer, the term of this patent is extended or adjusted under 35 U.S.C. 154(b) by 210 days.

(21) Appl. No.: 15/804,865

(22) Filed: Nov. 6, 2017

(65) Prior Publication Data
US 2019/0139650 A1  May 9, 2019

(51) Int. Cl.
*G21B 1/05* (2006.01)
*G21B 1/21* (2006.01)

(52) U.S. Cl.
CPC ............... *G21B 1/057* (2013.01); *G21B 1/05* (2013.01); *G21B 1/21* (2013.01)

(58) Field of Classification Search
CPC .................................. G21B 1/057; G21B 1/21
See application file for complete search history.

(56) References Cited

U.S. PATENT DOCUMENTS 2,992,345 A   7/1961  Hansen
3,194,739 A   7/1965  Kerst et al.
(Continued)

FOREIGN PATENT DOCUMENTS

CA    2750441       4/2012
EP    2460160 B1   6/2013
(Continued)

OTHER PUBLICATIONS

B. Bauer et al., "Magnetized High Energy Density Laboratory Plasmas," http://fusionenergy.lanl.gov/mhedlp-wp.pdf, Apr. 20, 2007, in 24 pages.
(Continued)

*Primary Examiner* — Lily C Garner
(74) *Attorney, Agent, or Firm* — Knobbe, Martens, Olson & Bear, LLP (57) ABSTRACT

Examples of a system for generating and compressing magnetized plasma are disclosed. The system comprises a plasma generator with a first closed end and an outlet, and a flux conserving chamber that is in tight fluid communication with the outlet of the plasma generator such that the generated plasma is injected into an inner cavity of the flux conserving chamber. An elongated central axial shaft is also provided such that the central shaft extends through the outlet of the plasma generator into the flux conserver. The end of the central shaft in connected to the flux conserver. A power source that comprises a formation power circuit and a shaft power circuit is provided to provide a formation power pulse to the plasma generator to generate magnetized plasma, and a shaft power pulse to the central axial shaft to generate a toroidal magnetic field into the plasma generator and the flux conserving chamber. The duration of the shaft power pulse is longer than the duration of the formation power pulse to maintain plasma q-profile at a pre-determined range. During plasma compression the shaft power pulse is increased to match the raise of the plasma poloidal (Continued)

field due to the compression and thus maintain the q-profile of the plasma.

9 Claims, 7 Drawing Sheets

(56) References Cited

U.S. PATENT DOCUMENTS

| | | | |
|---|---|---|---|
| 3,346,458 A | 10/1967 | Schmidt | |
| 3,579,028 A | 5/1971 | Paine | |
| 3,778,343 A | 12/1973 | Coppi et al. | |
| 4,023,065 A | 5/1977 | Koloc | |
| 4,068,147 A | 1/1978 | Wells | |
| 4,129,772 A | 12/1978 | Navratil et al. | |
| 4,228,380 A | 10/1980 | Wells | |
| 4,290,848 A | 9/1981 | Sudan | |
| 4,292,568 A | 9/1981 | Wells et al. | |
| 4,735,762 A | 4/1988 | Lasche | |
| 4,767,590 A | 8/1988 | Stix et al. | |
| 4,790,735 A | 12/1988 | Mayer | |
| 5,015,432 A | 5/1991 | Koloc | |
| 5,041,760 A | 8/1991 | Koloc | |
| 5,397,961 A | 3/1995 | Ayers et al. | |
| 5,429,030 A | 7/1995 | Tidman | |
| 5,811,944 A | 9/1998 | Sampayan et al. | |
| 5,821,705 A | 10/1998 | Sampayan et al. | |
| 5,923,716 A | 7/1999 | Meacham | |
| 6,150,628 A * | 11/2000 | Smith | H01J 27/16 156/345.28 |
| 6,396,213 B1 | 5/2002 | Koloc | |
| 6,477,216 B2 | 11/2002 | Koloc | |
| 6,593,539 B1 | 7/2003 | Miley et al. | |
| 6,611,106 B2 | 8/2003 | Monkhorst et al. | |
| 6,628,740 B2 | 9/2003 | Monkhorst et al. | |
| 6,660,997 B2 | 12/2003 | Laberge et al. | |
| 6,664,740 B2 | 12/2003 | Rostoker et al. | |
| 6,680,480 B2 | 1/2004 | Schoen | |
| 6,850,011 B2 | 2/2005 | Monkhorst et al. | |
| 6,852,942 B2 | 2/2005 | Monkhorst et al. | |
| 6,853,141 B2 | 2/2005 | Hoffman et al. | |
| 6,888,907 B2 | 5/2005 | Monkhorst et al. | |
| 6,891,911 B2 | 5/2005 | Rostoker et al. | |
| 6,894,446 B2 | 5/2005 | Monkhorst et al. | |
| 6,995,515 B2 | 2/2006 | Rostoker et al. | |
| 7,002,148 B2 | 2/2006 | Monkhorst et al. | |
| 7,015,646 B2 | 3/2006 | Rostoker et al. | |
| 7,026,763 B2 | 4/2006 | Rostoker et al. | |
| 7,119,491 B2 | 10/2006 | Rostoker et al. | |
| 7,126,284 B2 | 10/2006 | Rostoker et al. | |
| 7,129,656 B2 | 10/2006 | Rostoker et al. | |
| 7,173,385 B2 | 2/2007 | Caporaso et al. | |
| 7,180,242 B2 | 2/2007 | Rostoker et al. | |
| 7,230,201 B1 | 6/2007 | Miley et al. | |
| 7,232,985 B2 | 6/2007 | Monkhorst et al. | |
| 7,391,160 B2 | 6/2008 | Monkhorst et al. | |
| 7,439,678 B2 | 10/2008 | Rostoker et al. | |
| 7,459,654 B2 | 12/2008 | Monkhorst et al. | |
| 7,477,718 B2 | 1/2009 | Rostoker et al. | |
| 7,486,758 B1 | 2/2009 | Turchi | |
| 7,569,995 B2 | 8/2009 | Rostoker et al. | |
| 7,576,499 B2 | 8/2009 | Caporaso et al. | |
| 7,613,271 B2 | 11/2009 | Rostoker et al. | |
| 7,679,025 B1 | 3/2010 | Krishnan et al. | |
| 7,719,199 B2 | 5/2010 | Monkhorst et al. | |
| 7,831,008 B2 | 11/2010 | Perkins et al. | |
| 7,955,986 B2 | 6/2011 | Hoffman et al. | |
| 8,031,824 B2 | 10/2011 | Bystritskii et al. | |
| 8,537,958 B2 * | 9/2013 | Laberge | H05H 1/16 376/133 |
| 8,617,351 B2 | 12/2013 | Hoffman et al. | |
| 8,887,618 B2 * | 11/2014 | McIlwraith | G10K 15/04 91/394 |
| 8,891,719 B2 | 11/2014 | Howard et al. | |
| 8,994,271 B2 | 3/2015 | Kindel et al. | |
| 9,267,515 B2 * | 2/2016 | Suponitsky | F15D 1/08 |
| 9,271,383 B2 | 2/2016 | Howard et al. | |
| 9,403,191 B2 * | 8/2016 | McIlwraith | F42D 3/06 |
| 9,424,955 B2 * | 8/2016 | Laberge | H05H 1/16 |
| 9,463,478 B2 | 10/2016 | Suponitsky et al. | |
| 9,596,745 B2 * | 3/2017 | Laberge | H05H 1/16 |
| 9,967,963 B2 * | 5/2018 | Zindler | G21B 1/21 |
| 2003/0024476 A1 | 2/2003 | Rostoker et al. | |
| 2004/0079287 A1 | 4/2004 | Smith et al. | |
| 2005/0001556 A1 | 1/2005 | Hoffman et al. | |
| 2005/0129161 A1 * | 6/2005 | Laberge | G21B 3/008 376/144 |
| 2006/0039519 A1 | 2/2006 | Rostoker et al. | |
| 2006/0076897 A1 | 4/2006 | Rostoker et al. | |
| 2006/0198483 A1 * | 9/2006 | Laberge | G21B 3/008 376/100 |
| 2006/0198486 A1 * | 9/2006 | Laberge | G21B 3/00 376/150 |
| 2006/0198487 A1 | 9/2006 | Laberge | |
| 2006/0254520 A1 | 11/2006 | Rostoker et al. | |
| 2006/0267504 A1 | 11/2006 | VanDrie et al. | |
| 2007/0058770 A1 | 3/2007 | Fissenko et al. | |
| 2007/0096659 A1 | 5/2007 | Monkhorst et al. | |
| 2007/0145018 A1 | 6/2007 | Smith et al. | |
| 2007/0158534 A1 | 7/2007 | Monkhorst et al. | |
| 2007/0172017 A1 | 7/2007 | Rostoker et al. | |
| 2008/0205573 A1 | 8/2008 | Larson | |
| 2008/0251502 A1 | 10/2008 | Monkhorst et al. | |
| 2009/0152094 A1 | 6/2009 | Fissenko et al. | |
| 2009/0213975 A1 | 8/2009 | Sturt | |
| 2010/0067639 A1 | 3/2010 | Sturt | |
| 2010/0163130 A1 * | 7/2010 | Laberge | G21B 3/00 137/827 |
| 2010/0206847 A1 | 8/2010 | Chen et al. | |
| 2010/0215136 A1 | 8/2010 | Rusnak et al. | |
| 2011/0019789 A1 | 1/2011 | Rostoker et al. | |
| 2011/0026657 A1 | 2/2011 | Laberge et al. | |
| 2011/0026658 A1 | 2/2011 | Howard et al. | |
| 2011/0158369 A1 | 6/2011 | Larson | |
| 2011/0243292 A1 | 10/2011 | Howard et al. | |
| 2011/0293056 A1 | 12/2011 | Slough | |
| 2012/0014491 A1 | 1/2012 | Deeth | |
| 2012/0031070 A1 | 2/2012 | Slough et al. | |
| 2012/0085920 A1 | 4/2012 | Guethlein | |
| 2012/0155591 A1 | 6/2012 | Freeze | |
| 2013/0270747 A1 | 10/2013 | Tranter et al. | |
| 2014/0165552 A1 | 6/2014 | McIlwraith et al. | |
| 2014/0247913 A1 | 9/2014 | Laberge et al. | |
| 2015/0021339 A1 | 1/2015 | Felts et al. | |
| 2015/0152899 A1 | 6/2015 | McIlwraith et al. | |
| 2015/0216028 A1 | 7/2015 | Laberge et al. | |
| 2016/0129142 A1 | 5/2016 | Nettesheim | |
| 2016/0150627 A1 * | 5/2016 | Howard | G21B 3/006 376/133 |
| 2016/0314855 A1 | 10/2016 | Laberge et al. | |
| 2017/0303380 A1 | 10/2017 | Zindler et al. | |
| 2018/0286522 A1 * | 10/2018 | Laberge | G21B 3/008 |

FOREIGN PATENT DOCUMENTS

| | | |
|---|---|---|
| JP | S55-501066 | 12/1980 |
| WO | WO 80/00045 | 1/1980 |
| WO | WO 93/23587 | 11/1993 |
| WO | WO 99/00823 A1 | 1/1999 |
| WO | WO 2011/014577 A1 | 2/2011 |
| WO | WO 2011/084903 A1 | 7/2011 |
| WO | WO 2011/154172 A1 | 12/2011 |
| WO | WO 2012/113057 A1 | 8/2012 |
| WO | WO 2014/032186 A1 | 3/2014 |
| WO | WO 2016/026040 A1 | 2/2016 |
| WO | WO-2016026040 A1 * | 2/2016 ............... G21B 1/21 |

OTHER PUBLICATIONS

Bellan, P.M., "Spheromaks: A practical application of magnetohydrodynamic dynamos and plasma self-organization," Imperial College Press, 2000, pp. 1-9, 268-275.

(56) References Cited

OTHER PUBLICATIONS

Browning, P.K. et al., "Power Flow in a Gun-Injected Spheromak Plasma", The American Physical Society, Physical Review Letters, vol. 68, No. 11, Mar. 16, 1992, pp. 1718-1721.
J. H. Degnan et al, "Compression of compact toroids in conical-coaxial geometry", Fusion Technology, Mar. 1995, vol. 27, Issue 2, pp. 107-114.
J. H. Degnan et al., "Compact toroid formation, compression, and acceleration", Phys. Fluids B, Aug. 1993, vol. 5, Issue 8, pp. 2938-2958.
M. Delage et al., "Progress Towards Acoustic Magnetized Target Fusion: An Overview of the R&D Program at General Fusion", 33rd Ann. Conf. Can. Nuc. Soc., Jun. 2012, in 13 pages.
R.C. Duck et al., "Structure of the n=1 responsible for relaxation and current drive during sustainment of the SPHEX spheromak", Plasma Physics and Controlled Fusion, vol. 39, No. 5, May 1997, 715-736.
J. Eddleman et al., "Final Report on the LLNL Compact Torus Acceleration Project," Lawrence Livermore National Laboratory, UCRL-ID-120238, Mar. 19, 1995, in 62 pages.
J. D. Graham et. al., "Shiva Star—Marauder Compact Torus System," Digest of Technical Papers, 8$^{th}$ IEEE International Pulsed Power Conference, Jun. 1991 pp. 990-993.
T.K. Fowler, "Pulsed Spheromak Fusion Reactors", Comments on Plasma Physics & Controlled Fusion, Comments on Modern Physics, vol. 1(3), Part C, Jun. 1999, pp. 83-98.
T.K. Fowler, "Pulsed Spheromak Reactor With Adiabatic Compression", Lawrence Livermore National Laboratory, Mar. 29, 1999, in 13 pages.
T.K. Fowler, "Stability of Spheromaks Compressed by Liquid Walls", Lawrence Livermore National Laboratory, Aug. 17, 1999, in 9 pages.
J. H. Hammer et al, "Experimental demonstration of acceleration and focusing of magnetically confined plasma rings", Physical Review Letters, Dec. 19, 1988, vol. 61, Issue 25, pp. 2843-2846.
C. W. Hartman et al, "Acceleration of Spheromak Toruses, Experimental results and fusion applications", OSTI ID: 5240480; DE90005312, Proceedings of 11th US/Japan workshop on field-reversed configurations and compact toroids; Nov. 7-9, 1989, Dec. 1, 1989, Los Alamos, NM, USA.
C.W. Hartman et al., "Acceleration of Compact Toruses and Fusion Applications", Workshop on Physics of Alternative Magnetic Confinement Schemes, UCRL-JC-106121 Preprint, Oct. 11, 1990, Issue UCRL-JC-106121 Prepr, Varenna, Italy.
C. W. Hartman et al., "Acceleration of Compact Toroid Plasma Rings for Fusion Applications," Lawrence Livermore National Laboratory, UCRL-98504, Prepared for Submittal to IAEA 12$^{th}$ International Conference on Plasma Physics and Controlled Nuclear Fusion Research in Nice, France, Oct. 12-19, 1988, in 16 pages.
C.W. Hartman et al., "Acceleration of Compact Torus Plasma Rings in a Coaxial Rail-Gun", 7th Symposium on Compact Toroid Research, Santa Fe, New Mexico, May 21-23, 1985, in 6 pages.
D.N. Hill et al., "Field and Current Amplification in the SSPX Spheromak", 19th IAEA Fusion Energy Conference, Oct. 8, 2002, in 8 pages.
S. Howard et al., "Development of merged compact toroids for use as a magnetized target fusion plasma", Journal of Fusion Energy, Nov. 11, 2008, vol. 28, No. 2, pp. 156-161, available Jun. 2008.
S.C. Hsu et al, "On the Jets, Kinks, and Spheromaks Formed by a Planar Magnetized Coaxial Gun", California Institute of Technology, Pasadena, CA 91125, Feb. 2, 2008, pp. 1-16.
R.C. Kirkpatrick, "Assessment of the Acoustically Driven MTF Experiments being conducted by Dr. Michel Laberge of General Fusion, Inc.," May 2007, in 3 pages.
Thomas W. Kornack, "Magnetic Reconnection Studies on SSX", Swarthmore College Department of Physics and Astronomy, Swarthmore, PA, USA, Jun. 10, 1998, pp. 2-56.
Michel Laberge, "Acoustic Wave Driven MTF Fusion Reactor," Mar. 2007, in 20 pages.

Michel Laberge, "An Acoustically Driven Magnetized Target Fusion Reactor," Journal of Fusion Energy, vol. 27, Nos. 1-2, Jul. 11, 2007, pp. 65-68.
Michel Laberge, "Evidence of Fusion Products in Acoustically Driven MTF," Mar. 2007, in 41 pages.
Michel Laberge, "Experimental Results for an Acoustic Driver for MTF," Journal of Fusion Energy, Jun. 2009, vol. 28, Nos. 2, pp. 179-182, available Jun. 2008.
D. Liu et al., "Bench Test and Preliminary Results of Vertical Compact Torus Injection Experiments on the STOR-M Tokamak", Nuclear Fusion 46 (006), Dec. 16, 2005, pp. 104-109.
Ch. Mangeant et al., "Syrinx Project: Compact Pulse-Current Generators Devoted to Material Study Under Isentropic Compression Loading", in Pulsed Power Plasma Science, IEEE, Jun. 2001, in 4 pages.
T. E. Markusic et al., "Visualization of Current Sheet Canting in a Pulsed Plasma Accelerator", IEPC-99-206, 26$^{th}$ International Electric Propulsion Conference in Kitakyushu, Japan, Oct. 17-21, 1999, in 8 pages.
H. S. Mclean et al, "Design and operation of a passively switched repetitive compact toroid plasma accelerator", Fusion Technology, May 1998, vol. 33, pp. 252-272.
D.J. Meeker et al., "A High Efficiency I.C.F. Driver Employing Magnetically Confined Plasma Rings", Lawrence Livermore National Laboratory, Sixth Topical Meeting on the Technology of Fusion Energy, San Francisco, California, Mar. 3-7, 1985, in 8 pages.
R. L. Miller and R. A. Krakowski, "Assessment of the slowly-imploding liner (LINUS) fusion reactor concept", Los Alamos Scientific Laboratory, Oct. 1980, Issue Rept. No. LA-UR-80-3, Los Alamos, NM, USA, in 10 pages.
J. Miyazawa et al., "Design of Spheromak Injector Using Conical Accelerator for Large Helical Device", Fusion Engineering and Design 54 (2001), pp. 1-12.
R. W. Moir et al., "HYLIFE-II: An approach to a long-lived, first-wall component for inertial fusion power plants", Lawrence Livermore National Lab, Aug. 1, 1994, vol. Report No. UCRL-J, Issue CONF-940933-46, in 15 pages.
G. Olynyk et al., "Development of a Compact Toroid Fuelling System for ITER", Nuclear Fusion, vol. 48, No. 9, Sep. 2008, in 11 pages.
G. M. Olynyk, "Design and evaluation of a repetitive-fire compact toroid fuelling system for ITER," thesis submitted to the Department of Physics, Queen's University, Ontario, Canada, Mar. 2007, in 48 pages.
R. E. Peterkin, Jr., "Direct electromagnetic acceleration of a compact toroid to high density and high speed", Physical Review Letters, Apr. 17, 1995, vol. 74, Issue 16, pp. 3165-3168.
R. Raman et al., "Compact Toroid Fueling for ITER", Fusion Engineering and Design 39-40 (1998), pp. 977-985.
R. Raman et al., "Experimental Demonstration of Nondisruptive, Central Fueling of a Tokamak by Compact Toroid Injection", Phys. Rev. Lett., 1994, pp. 3101-3105.
R. Raman et al., "Experimental Demonstration of Tokamak Fueling by Compact Toroid Injection", Nuclear Fusion, vol. 37, 1997, pp. 967-972.
R. Raman et al., "ITER Task D315 (1997): Conceptual Design Definition of a Compact Toroid Injection System", CFFTP G-9729, Sep. 1997, in 24 pages.
Roger Raman et al., "Design of the Compact Toroid Fueler Tokamak de Varennes", Fusion Technology, A Journal of the Nuclear Society, vol. 24, No. 3, Nov. 1993, pp. 239-250.
Y.C.F. Thio et al., "Magnetized Target Fusion Driven by Plasma Liners", 2002, in 3 pages.
Y. C. F. Thio et al., "Magnetized Target Fusion in a Spheroidal Geometry With Standoff Drivers," Fusion Technology 20, 1991, in 22 pages.
Y. C. F. Thio et al., "Pulsed Electromagnetic Acceleration of Plasmas," 38$^{th}$ AIAA/ASME/SAE/ASEE Joint Propulsion Conference & Exhibit, Jul. 7-10, 2002, in 9 pages.
M.T. Tobin et al, "The Compact Torus Accelerator, A Driver for ICF", UCRL-93901-R1, Lawrence Livermore National Laboratory, Jul. 31, 1986, in 9 pages.

(56) References Cited

OTHER PUBLICATIONS

F. D. Witherspoon et al., "A contoured gap coaxial plasma gun with injected plasma armature," American Institute of Physics, Review of Scientific Instruments 80, 083506, Aug. 2009, in 15 pages.
F. D. Witherspoon et al., "Pulsed Injector Development for Dense Plasma Jets," Research Funded by the DOE Office of Fusion Energy Science through Grants DE-FG02-04ER83978, DE-FG02-05ER54810, DE-FG02-05ER84189, Feb. 2007, in 32 pages.
G.A. Wurden et al., "FRC Plasma Studies on the FRX-L Plasma Injector for MTF", Paper IC/P6-53, 50th IAEA Fusion Energy Conference, Nov. 2004, in 7 pages.
G.A. Wurden et al., "High Pressure Field Reversed Configuration Plasmas in FRX-L for Magnetized Target Fusion", Jan. 26, 2006, in 2 pages.
G.A. Wurden et al., "Magnetized Target Fusion: A Burning FRC Plasma in an Imploded Metal Can", J. Plasma Fusion Res. Series, vol. 2, Aug. 1999, pp. 238-241.
G.A. Wurden et al., "Progress on the FRX-L FRC Plasma Injector at LANL for Magnetized Target Fusion", Mar. 1, 2002, pp. 1-6.
G.A. Wurden, Letter to Dr. Laberge, May 2007, in 1 page.
C. Xiao et al., "Improved Confinement Induced by Tangential Injection of Compact Torus Into the Saskatchewan Torus-Modified (STOR-M) Tokamak", Phys. Plasmas, vol. 11, No. 8, Aug. 2004, pp. 4041-4049.
V. Suponitsky et al., "Richtmyer-Meshkov instability of a liquid-gas interface driven by a cylindrical imploding wave", Computers & Fluids, vol. 89, Jan. 20, 2014, in 19 pages.
V. Suponitsky et al., "An Overview of Computational Results at General Fusion Inc. with Focus on Hydrodynamics", Proceedings of CFD Society of Canada Conference, May 2012, in 9 pages.
V. Suponitsky et al., "On the Collapse of a Gas Cavity by an Imploding Molten Lead Shell and Richtmyer-Meshkov Instability", Proceedings of the 20th Annual Conference of the CFD Society of Canada, Canmore, Alberta, Canada, May 9-12, 2012, in 8 pages.
Kiuttu, G.F., et al., "Acceleration and compression of compact toroid plasmas," 1994 10th International Conference on High-Power Particle Beams, IET, vol. 1, pp. 150-158, Jun. 1994.
Logan, B.G., et al., "Compact Torus Accelerator Driven Inertial Confinement Fusion Power Plant HYLIFE-CT," Lawrence Livermore National Laboratory, UCRL-TR-211025, Apr. 1, 2005, in 85 pages.
N. M. Schnurr et. al., "An Analytical Investigation of the Impingement of Jets on Curved Deflectors", AIAA Journal, vol. 10, No. 11, Nov. 1972, in 41 pages.
Slough, John, "Multi-Megawatt Propulsion Based on a Compact Toroid Thruster", $29^{th}$ International Electric Propulsion Conference, Nov. 4, 2005, in 15 pages.
Richardson et al., "Status of Progress Towards Acoustic Magnetized Target Fusion at General Fusion", $34^{th}$ Annual Conference on the Canadian Nuclear Society, Jun. 12, 2013, in 15 pages.
Argomedo, F. B., et al., "Model-based Control of the Magnetic Flux Profile in a Tokamak Plasma," in 49th IEEE Conference on Decision and Control, Dec. 2010, in 6 pages.

Moreau, D., "Plasma Shape, Profiles and Flux Control for High-Bootstrap Steady State Tokamaks," European Fusion Development Agreement, IEA W59 Shape and Aspect Ratio Optimization for High Beta, Steady-State Tokamaks, San Diego, Feb. 2005, in 30 pages.
Witrant, E., et al., "A Simplified Plasma Current Profile Model for Tokamak Control," Jan. 2007, in 7 pages.
Asai et al., "MHD Activity in an Extremely High-Beta Compact Toroid," Topics in Magnetohydrodynamics, Mar. 9, 2012, pp. 117-134.
Asai et al., "New control methods for stabilization and equilibrium of a field-reversed configuration," Innovative Confinement Concepts (ICC) and US-Japan Compact Torus Plasma (CT) Workshop, Aug. 16-19, 2011, in 4 pages.
Barton et al., "Closed-loop Control of the Safety Factor Profile in the TCV Tokamak," 53rd IEEE Conference on Decision and Control, Dec. 15-17, 2014, Los Angeles, California, in 6 pages.
Crisanti et al., "Active Control of the plasma current profile on JET Experiments," 30th EPS Conference on Control Fusion and Plasma Physics, St. Petersburg, Jul. 7-11, 2003, ECA, vol. 27A, in 4 pages.
Kessel, C.E., "Control of Plasma Profiles in a Tokamak," Princeton Plasma Physics Laboratory, NSF Workshop on Mathematical Modeling and Control of Plasma in Magnetic Fusion, General Atomics, May 11-12, 2006, in 20 pages.
Kessel et al., "Simulations and Experiments on Modifying the q-Profile for Advanced Tokamak Discharges on Alcator C-Mod," APS Division of Plasma Physics, Nov. 2007, in 40 pages.
Nogi et al., "Stabilization of Rotational Instability in FRC by an Axial Current," US-Japan Workshop on Field Reversed Configurations with Steady-State High-Temperature Fusion Plasmas and the 11th US-Japan Workshop on Compact Toroids, 1989, pp. 78-81.
Willett et al., "The internal magnetic structure and current drive in the SPHEX spheromak," Plasma Physics Control Fusion, 41, Mar. 3, 1999, in 18 pages.
O'Shea, P. et al., "Magnetized Target Fusion at General Fusion: An Overview," 59th Annual Meeting of APS Division of Plasma Physics, Milwaukee, Wisconsin, Oct. 2017, in 1 page.
Reynolds, M., et al., "MHD Simulation of Plasma Compression Experiments," 59th Annual Meeting of APS Division of Plasma Physics, Milwaukee, Wisconsin, Oct. 2017, in 1 page.
Laberge, M., "Plasma Compression Experiments at General Fusion," EPR 2017 Exploratory Plasma and Fusion Research Workshop, Vancouver, Canada, Aug. 2017, in 19 pages.
Laberge, M., "Plasma Compression Experiments at General Fusion," EPR 2017 Exploratory Plasma and Fusion Research Workshop, Vancouver, Canada, Aug. 2017, paper P2.004, in 1 page.
Reynolds, M., et al., "MHD Simulation of plasma compression experiments," EPR 2017 Exploratory Plasma and Fusion Research Workshop, Vancouver, Canada, Aug. 2017, in 16 pages.
Reynolds, M., et al., "MHD Simulation of plasma compression experiments," EPR 2017 Exploratory Plasma and Fusion Research Workshop, Vancouver, Canada, Aug. 2017, paper P2.007, in 1 page.

\* cited by examiner

SYSTEM AND METHOD FOR PLASMA GENERATION AND COMPRESSION

TECHNICAL FIELD

The present disclosure relates generally to a system and a method for generating plasma and more particularly to a system and a method for generating plasma and confining such plasma while compressing it.

BACKGROUND

Unless otherwise indicated herein, the materials described in this section are not prior art to the claims in this application and are not admitted to be prior art by inclusion in this section.

Plasma is a state of matter similar to gas in which at least part of the particles are ionized. The presence of charged particles (e.g. positive ions and negative electrons) makes plasma electrically conductive. Plasma with a magnetic field strong enough to influence the motion of the charged particles is called magnetized plasma. A plasma torus is a magnetized plasma shaped into a toroidal configuration (donut shape), with linked poloidal and toroidal (in some cases) closed magnetic field lines. Toroidal magnetic field comprises magnetic field lines that go parallel to a magnetic axis of the plasma torus. The toroidal field is generated by a current flowing in a poloidal direction around the plasma's magnetic axis. Poloidal magnetic field comprises magnetic field lines that go around the magnetic axis of the plasma torus and is generated by a current flowing in toroidal direction, parallel to the magnetic axis. As a magnetic field line runs many turns around the plasma in the toroidal and poloidal direction, it defines a "flux surface" at a constant radius from the plasma's magnetic axis. The extent of linkage of the poloidal and toroidal magnetic fluxes defines a helicity of the plasma torus. The magnetic field in the magnetized plasma confines plasma energy by suppressing the transit of heat and particles from the core of the plasma to its edge. Since the path of charged particles in a magnetic field is confined to spirals that travel along field lines great care should be taken to ensure that the magnetic field lines run in the toroidal and poloidal direction but not along the radial direction to avoid a direct route from the core to the edge of the plasma.

The plasma torus can have, for example: a spheromak configuration, a Field Reversed Configuration (FRC), a tokamak configuration, a spherical tokamak (ST) configuration, a reversed field pinch (RFP), a stellarator and any other configurations of magnetized plasma.

Controlled thermonuclear fusion is based on the fusion of light nuclei present in plasma to form a heavier nucleus. Stabilization and maintaining the plasma in a stable configuration is very important for any fusion technology. In the case of magnetized plasma configurations, plasma magnetic field (poloidal and/or toroidal field component) is a key plasma property related to plasma stability and plasma performance. Maintaining a proper magnetic field structure for prolonged time is important in order to get more nuclei to fuse. Compressing plasma may increase plasma density and plasma energy so that more nuclei get to fuse in shorter time period meaning that compressed plasma need to be confined and stable for shorter time period, however compressing the plasma may cause destabilization of plasma magnetic structure and destroying plasma confinement. Thus it is important to maintain plasma magnetic structure stable during plasma compression in order to get nuclei to fuse.

SUMMARY

In one aspect, a system for generating and compressing magnetized plasma is provided. The system comprises a plasma generator with a first closed end and an outlet, and a flux conserving chamber that is in tight fluid communication with the outlet of the plasma generator, such that the generated magnetized plasma is injected into an inner cavity of the flux conserving chamber. The system further comprises an elongated central axial shaft with an upper section positioned within the plasma generator and a lower section extending out of the outlet of the plasma generator into the flux conserver. The end of the lower section of the central axial shaft is connected to the wall of the flux conserver. A gas injection system is provided to inject a gas into the plasma generator. The system further comprises a power source that comprises a formation power circuit configured to provide a formation power pulse to the plasma generator to ionize the injected gas and generate magnetized plasma, and a shaft power circuit configured to provide a shaft power pulse to the central axial shaft to generate a toroidal magnetic field into the plasma generator and the flux conserving chamber. A plasma compression driver configured to compress the plasma trapped in the inner cavity is also provided. During compression time period, the shaft power circuit is configured to provide an additional shaft current pulse to increase plasma toroidal field in order to maintain a ratio of plasma's toroidal field to plasma's poloidal field at the pre-determined range during compression. The system further comprises a controller to control the trigger time of the power source to provide the formation power pulse separately from the shaft power pulse, such that the shaft current pulse is independently controlled from the formation current pulse.

In one aspect, the controller triggers the shaft power circuit prior to the formation power circuit such that a pre-existing toroidal field is provided in the flux conserving chamber before the formation of the magnetized plasma.

In another aspect, the controller is programmed to provide the additional shaft current pulse at a pre-determined time. A timing of the additional shaft current pulse is determined based on a triggering time of the compression driver and a compression trajectory.

In another aspect, the shaft power circuit is configured such that a profile shape of the additional shaft current pulse is designed to increase the plasma's toroidal field to match plasma's poloidal field during compression.

In one aspect, a method for generating and compressing magnetized plasma is provided. The method includes injecting a gas in a plasma generator; providing a toroidal field in a flux conserver by flowing a current through a central axial shaft; providing a current pulse to the plasma generator to generate a magnetized plasma; injecting the magnetized plasma into the flux conserver; compressing the plasma using a compression driver and adjusting a shaft current pulse to maintain a ratio of plasma's toroidal field to plasma's poloidal field at a predetermined range during compression period.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Figure 1:
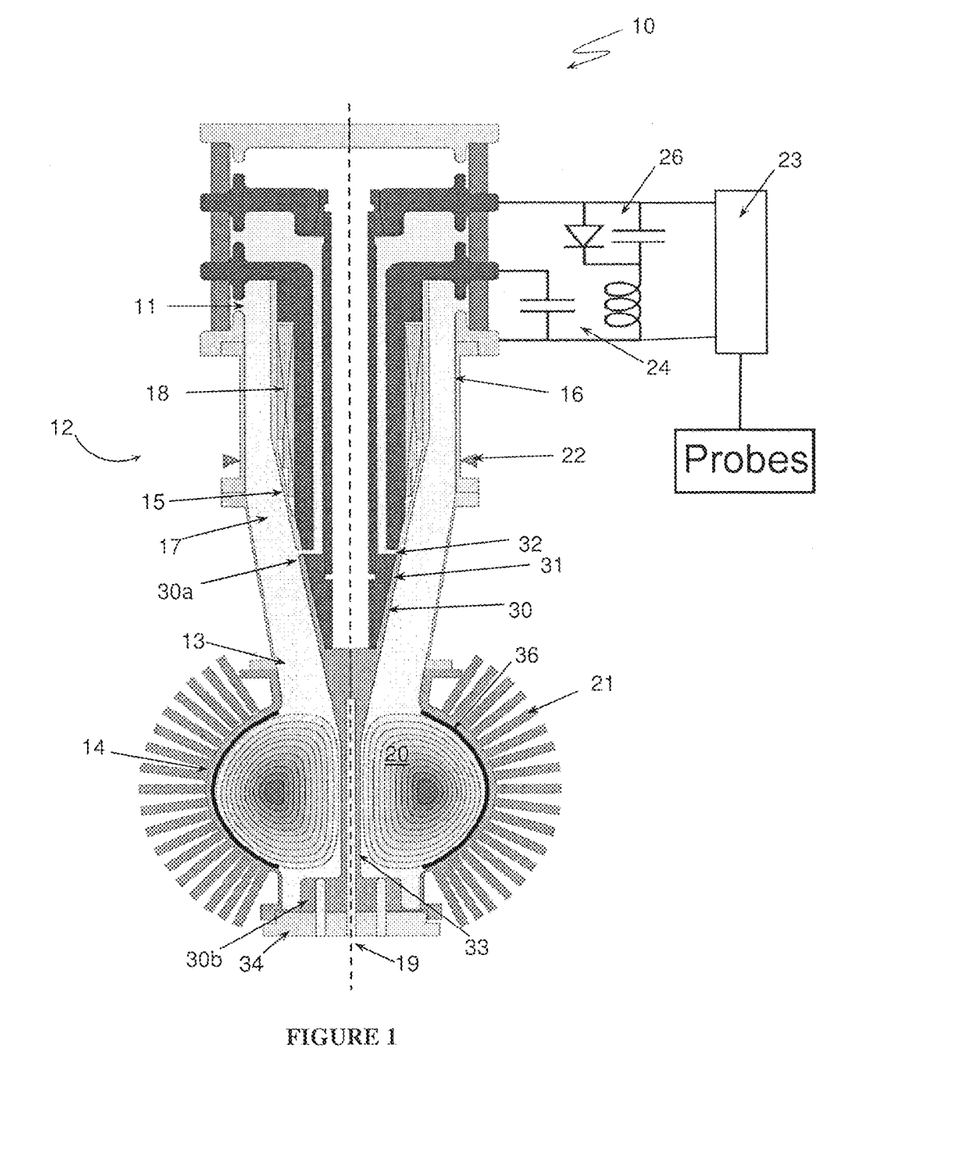
FIG. 1 is a cross-sectional schematic view of an example of a plasma generation and compression system showing a plasma generator and a flux conserving chamber with a compression driver connected to the flux conserving chamber.

FIG. 1 shows one non-limiting embodiment of a plasma generation and compression system 10 having a plasma generator 12 that is in fluid communication with an inner evacuated cavity of a flux conserving chamber 14 (also sometimes referred to as a flux conserver 14). The plasma system 10 is at least partially evacuated using a pumping system (not shown). The generator 12 is configured to generate a magnetized plasma 20 and can have a first (closed) end 11 and an outlet 13 that is in fluid communication with the inner cavity of the flux conserving chamber 14. The plasma generator 12 can comprise an inner, formation electrode 15 coaxial with a longitudinal axis 19 of the system 10 and an outer electrode 16 that is coaxial to and surrounds the inner formation electrode 15 thus forming an annular plasma propagating channel 17 therein between. The plasma generator 12 can further comprise an elongated central axial shaft 30 that extends out of the generator 12 into the flux conserver 14. An upper section 31 of the central shaft 30 is positioned within the plasma generator 12 while a lower section 33 of the shaft 30 extends along the axis 19 into the flux conserving chamber 14, such that a second end 30b of the central shaft 30 can be in contact to an end plate 34 of the flux conserving chamber 14. A first end 30a of the shaft 30 can be separated from the formation electrode 15 forming a gap 32 therein between. In the illustrated example, the outer electrode 16, the inner electrode 15 and the upper section 31 of the shaft 30 have a slightly tapering configuration toward the outlet 13, such that the plasma propagation channel 17 has a tapered configuration as well, meaning that a circumference of the plasma propagation channel 17 at the first end 11 is greater than the circumference of the channel 17 at the outlet 13. However, person skilled in the art would understand that the outer and inner electrodes 16, 15 and the shaft 30 can all have cylindrical shape forming a propagation channel 17 with straight configuration without departing from the scope of the invention. In one implementation, the outer electrode 16 can have tapered geometry while inner electrode 15 and the shaft 30 can have cylindrical geometry and provide a plasma propagation channel 17 with a tapered geometry. In the illustrated example shown in FIG. 1, the shaft 30 is shaped such that its upper section 31 is generally conically shaped while its lower section 33 is generally cylindrical. This is for illustration purposes only and the size and the shape of the central shaft is determined based on the size and shape of the flux conserver 14 and the parameters of the plasma generator 12. For example, the shaft 30 can have generally cylindrical shape through the entire length or it can have any other suitable shape or a combination thereof without departing from the scope of the invention. The size and the shape of the shaft 30 define the size and the shape of a portion of the plasma channel 17 defined as an annular space between the central shaft 30 and the outer electrode 16. The flux conserver 14, the axial shaft 30 and the electrodes 15 and 16 are made from a conductive and high-vacuum-compatible material.

In one implementation, the upper section 31 of the shaft 30 can be a liquid metal reservoir that contains a liquid metal, and the lower section 33 of the shaft 30 can be a liquid metal guide that flows out through the outlet formed in the liquid metal reservoir, through the flux conserver 14 and into a catcher (not shown) positioned, for example, within the end plate 34. The liquid metal from the catcher can be recirculated back into the liquid metal reservoir using one or more pumps. The liquid guide can flow continuously or the flow can be regulated using a valve that is in communication with the reservoir's outlet.

The flux conserver 14 can comprise an opening that is aligned with the outlet 13 of the plasma generator 12 so that the plasma 20 generated in the plasma generator 12 can be injected into the inner evacuated cavity. The flux conserver 14 can further comprise a liner 36 that defines the inner evacuated cavity. For example, the liner 36 can be formed by injecting a liquid medium into the flux conserver 14 forming the evacuated cavity. Examples of liquid liners and methods for forming evacuated cavity into the liquid liners are described in U.S. Pat. Nos. 8,891,719, 8,537,958 and US patent application publication No. 20100163130. In one implementation, the liner 36 can be a solid liner, such as for example a wall of the flux conserver 14 or a solid liner attached to/coated on an inner side of the wall of the flux conserver 14.

A series of magnetic coils 18 can be used to form an initial (stuffing) magnetic field in the plasma propagation channel 17. For example, some of the coils 18 can be positioned within the inner electrode 15 while some of the coils 18 can be positioned around the outer electrode 16, such that a desired configuration of the initial stuffing magnetic field is distributed in the plasma propagation channel 17 before the formation of the plasma. The magnetic field lines of the stuffing magnetic field extend between the inner and the outer electrodes 15 and 16. Any number of coils 18 can be provided and positioned around or within the plasma generator 12 to provide the desired strength and configuration of the initial magnetic field. In some implementation, a high permeability (e.g. ferromagnetic) core can be included within the inner electrode 15 and/or within the axial shaft 30 in order to concentrate initial (stuffing) magnetic field.

A number of gas valves 22 that are in fluid communication with the annular plasma propagation channel 17 are arranged as a ring around the periphery of the plasma generator 12 to symmetrically inject a precise quantity of gas into the channel 17. Each of the valves 22 are in fluid communication with a gas reservoir (not shown) and are operable to provide a substantially symmetrical introduction of the gas into the channel 17 of the plasma generator 12. The injected gas can be for example, one or more isotopes of light elements i.e., isotopes of hydrogen (e.g., deuterium and/or tritium) and/or isotopes of helium (e.g., helium-3) or any other gas or gas mixture. The system 10 further comprises a power source comprising a formation power circuit 24 which includes at least one capacitor bank. The power source comprising the formation power circuit 24 can be a pulsed power source configured to provide a discharge pulse to the inner electrode 15 so that a current flows from the inner electrode 15, across the gas to the outer electrode 16, ionizing the gas and forming plasma.

The coils 18 setup the initial stuffing magnetic field prior to the gas being injected into the annular plasma propagation channel 17 and prior to the current being discharged between the electrodes 15 and 16. For example, the stuffing magnetic field can be applied a few seconds before the discharge. Once the gas diffuses to at least partially fill the channel 17, the power source 24 can be triggered causing a formation current pulse to flow between the electrodes 15 and 16. The current passes through the gas in a substantially radial direction, ionizing the gas and forming the plasma. This current can create a plasma toroidal magnetic field, and the gradient of the magnetic pressure can exert a force (Lorentz force) $\vec{J} \times \vec{B}$ that can cause motion of the plasma down the annular channel 17 toward the flux conserver 14. As the plasma moves forward, it interacts with the stuffing magnetic field generated by the coils 18. The force that displaces the plasma toward the flux conserver 14 has sufficient strength to overcome the tension force of the stuffing magnetic field so that the stuffing field is weakened and deformed by the advancing plasma (bubbling stage). Eventually the plasma breaks free so that the magnetic field can wrap around the plasma forming a magnetized plasma torus 20 with a poloidal magnetic field and a toroidal magnetic field. The magnetized plasma 20 can be a toroidal plasma such as for example, a spheromak, a spherical tokamak or any other suitable configuration of magnetized plasma.

The central shaft 30 is electrically isolated from the inner electrode 15 and is electrically conductive, so that a current flowing through the central shaft 30 generates a toroidal magnetic field in the plasma generator 12 and the flux conserver 14. For example, an additional power source comprising a shaft power circuit 26 can provide a power pulse to the central axial shaft 30. The additional power source comprising the shaft power circuit 26 can be a pulsed power source. In one implementation, a single pulsed power source can provide both a formation power pulse to the formation electrode 15 and a shaft shaft's power pulse to the central shaft 30 without departing from the scope of the invention. For example, the power source can comprise the formation power circuit 24 and the shaft power circuit 26. The current provided by the shaft power circuit 26 flows along the shaft 30 and back on an inner wall of the flux conserving chamber 14 and the outer electrode 16, thus generating a toroidal field within the plasma generator 12 and flux conserver 14. The toroidal field formed by the shaft current flow has magnetic lines that extend around the central axial shaft 30.

Figure 2:
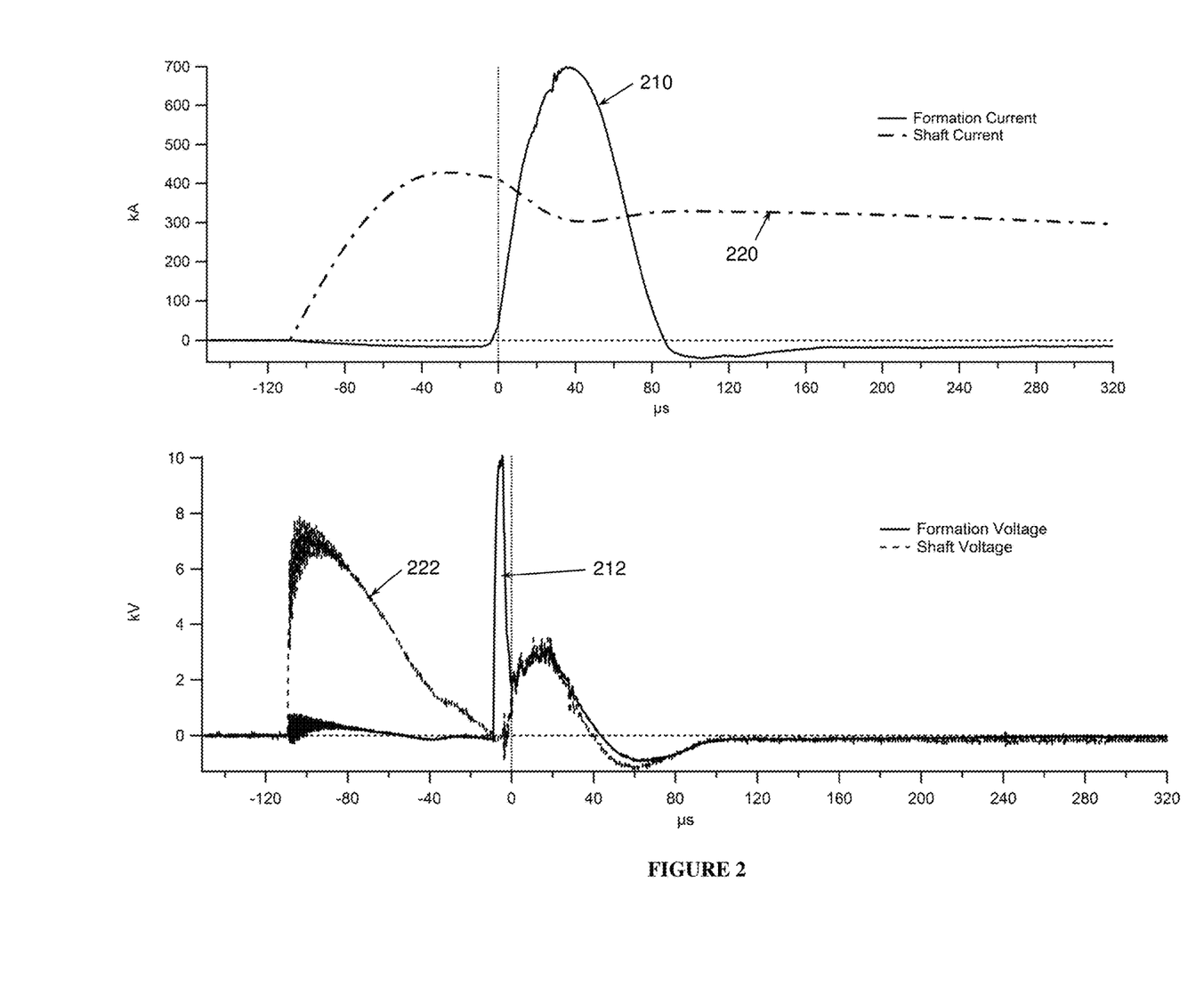
FIG. 2, upper plot, is a graphical presentation of a shaft current pulse in kA and a formation current pulse in kA over time in microseconds (μs), while a lower plot is a graphical presentation of a voltage shaft pulse in kV and a formation voltage pulse in kV over time in microseconds (μs).

The shaft power circuit 26 can provide the power pulse to the central axial shaft 30 ahead of the plasma formation pulse thereby creating a toroidal magnetic field in the plasma generator 12 and the flux conserver 14 before the formation of the plasma 20. So, the plasma formation can occur with a pre-existing toroidal field in the plasma generator 12 and the flux conserver 14. When the formation pulse is discharged and the plasma is accelerated down the plasma generator 12 due to the Lorentz force, it will push such preexisting toroidal field deflecting its field lines. This toroidal field can diffuse into the plasma and can increase plasma toroidal field. FIG. 2 upper plot shows an example of a formation current curve 210 and a shaft current curve 220 while lower plot shows a formation voltage curve 212 and a shaft voltage curve 222. As can be noticed from the illustrated example, the formation current pulse can be about ~700 kA for a duration of about 90 µs, while the shaft current is about 400 kA and is triggered about 110 µs prior to the triggering time of the formation current pulse. This is for illustration purposes only, and the triggering time of the shaft pulse can be determined depending on the properties of the power source comprising the shaft power circuit 26, desired parameters of the plasma 20 and the size and geometry of the plasma system 10. In addition, the shaft current pulse can be set such that the current can continue flowing long after the plasma 20 is formed and injected into the flux conserving chamber 14, so that the current flowing can put additional toroidal field into the plasma. For example, the shaft's current pulse can last about 2 ms while the formation current pulse last about 80 µs. The longer shaft current pulse can help in controlling plasma stability and confinement by controlling plasma safety factor q. The safety factor q can best be described by tracing out a magnetic field line in the plasma and counting the number of toroidal turns it completes before completing one poloidal turn. q-factor at the plasma's core is in general different than q-factor at the plasma's edge, so q-profile is plasma's q-factor along its radius. When q is a rational number (i.e. 1/2, 1, 3/2, 2 etc.) the plasma will resonate and will develop an asymmetry. Often this asymmetry rotates around the torus and can be detected by the phase of signals obtained from a number of sensors as an oscillation in time. Such an asymmetry can reduce the heat confinement of the plasma configuration. So, fine tuning and adjustment of the plasma's q-profile can result in low plasma fluctuations and improved plasma confinement. Measuring plasma's q-profile and its control in real time is complex exercise requiring complex modeling. However, the inventors have found that the ratio of plasma's toroidal field to the poloidal field can be used as a proxy for q-profile measurements. The ratio of the toroidal to poloidal field can be controlled and maintained to an empirically determined optimum value/range that relates to a predetermined q-value. Control of the toroidal field can be achieved by adjusting the shaft current pulse. For example, if the magnetic field ratio falls below the empirically determined optimum value, the toroidal field can be increased by increasing the shaft current pulse, which will raise the magnetic field ratio up, keeping the plasma's q between critical values. For example, the pre-determined q-value can be any value different than a rational number, such as for example, greater than 1 and smaller than 3/2 ($1<q<3/2$).

Figure 3:
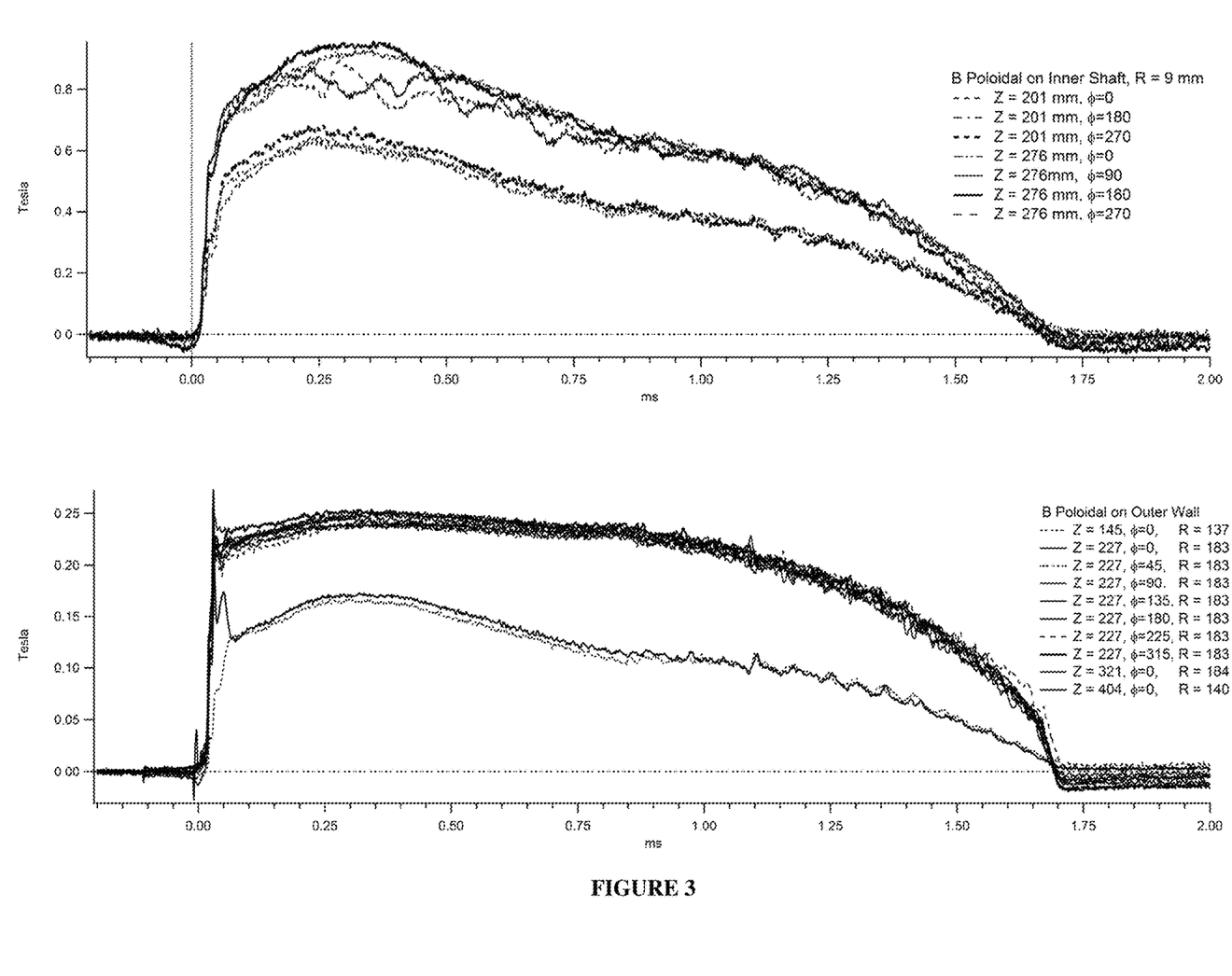
FIG. 3, upper plot is a graphical presentation of a plasma poloidal field near central shaft in tesla (T) over time in milliseconds (ms) and lower plot is a graphical presentation of a plasma poloidal field near outer wall in tesla (T) over time in milliseconds (ms) in one exemplary shot using a system of the present invention.

The system 10 can comprise a number of viewing ports at various axial positions along the plasma generator 12 and/or flux conserver 14 to accommodate various measuring probes/detectors. An array of diagnostics can be provided to measure plasma's parameters (e.g. magnetic field, temperature, density, impurities), as well as system's parameters (e.g. current, voltage, etc.). Plasma magnetic configuration can be determined using an array of magnetic probes, such as for example B-dot probes or any other suitable magnetic probes. Such magnetic probes can be positioned in the wall of the central axial shaft 30, the flux conserver 14, and/or the plasma generator 12 and can be configured to provide signals of both the poloidal and toroidal field in the plasma at various axial/radial and/or angular positions over time. Each of the magnetic probes can provide one signal for plasma's poloidal field and another signal for plasma's toroidal field. For example, each of the probes can comprise two separate coils located near probe's tip. One of the coils can be oriented so that it will capture the signal of plasma's poloidal field and the other coil can be directed to measure plasma's toroidal field. Each of the probes can be at different radial, axial and/or angular position so that the magnetic field at various radial, axial and/or angular positions can be measured over time. For example, FIG. 3 upper plot illustrates an example of a plasma poloidal field over time obtained from different probes (one curve per probe) positioned on the central shaft 30 (providing signals of plasma magnetic field at the inner edge of the plasma) while the lower plot illustrates the plasma poloidal field over time obtained from the probes positioned near the wall of the flux conserver (signals od plasma magnetic field at the outer edge of the plasma torus). The signals at the upper plot are from probes positioned at the same radial position (R=9 mm distance from the longitudinal axis 19 of the flux conserver 14) but different axial/angular position, while the signals at the lower plot are from probes positioned at the wall of the flux conserver 14 at various radial, axial and angular positions. As can be noticed, the plasma poloidal field in proximity to the central axial shaft has peak poloidal field of about 0.9 T while in proximity to the outer wall the peak poloidal field is about 0.25 T. The poloidal field decays after 1.7 ms, indicating a plasma life of about 1.7 ms. The signals from the magnetic probes can be used to estimate total toroidal field $\Delta B_{tor}$ and total poloidal field $\Delta B_{pol}$ and determine average q-profile. Being able to measure and determine plasma magnetic configuration is important to measure and control plasma q-profile since based on the signals obtained from the magnetic probes one can adjust the shaft current pulse in order to keep plasma q-profile within a pre-determined range.

The system 10 can further comprise a compression driver 21 configured to compress the plasma 20. For example, the compression driver can comprise a plurality of pneumatic pistons that generate a pressure wave in the liquid liner as described in US patent application publication No. 20100163130. So the generated pressure wave converges inward collapsing the inner cavity and compressing the plasma trapped therein. In one implementation, the compression driver can be a plurality of pneumatic valves or plasma guns or a chemical driver that can compress plasma by pushing the liner 36. Any other suitable compression driver configured to compress plasma can be used without departing from the scope of the invention.

The system 10 can further comprise a controller 23 that is in communication with the formation power circuit 24, shaft power circuit 26, compression driver 21 and diagnostic probes, i.e. magnetic probes. The controller 23 can be used to control the timing and duration of the formation current pulse, the shaft current pulse and the compression driver 21. The controller 23 can comprise an input unit, an output unit and a processing unit. The controller 23 can be configured to independently control the shaft power circuit 26 and the formation power circuit 24.

Figure 4:
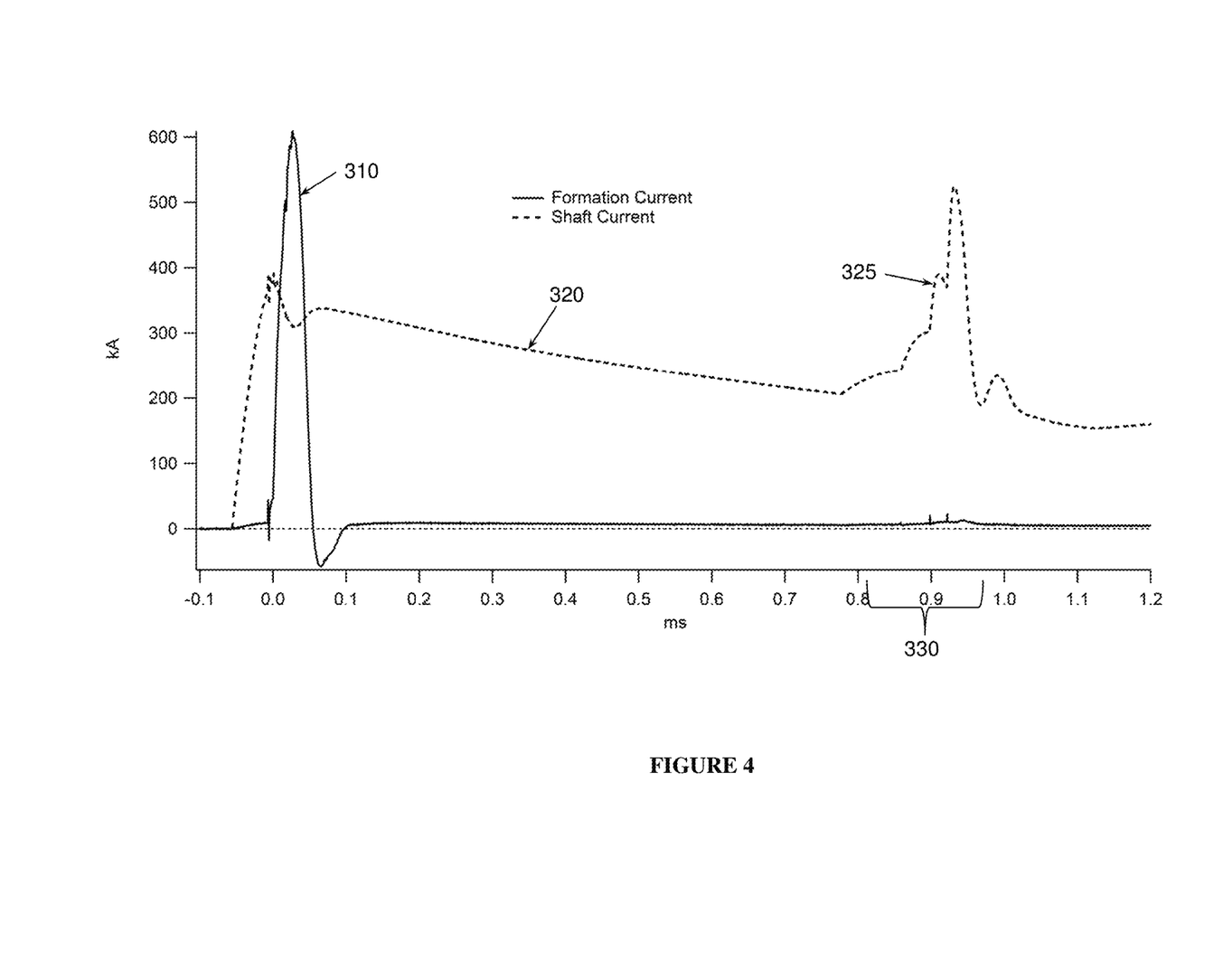
FIG. 4 is a graphical presentation of a formation current pulse in kA and a shaft current pulse in kA over time in milliseconds (ms) during plasma compression period.

The shaft power circuit 26 can be designed as a single stage or multi-stage circuit to provide and sustain sufficient toroidal field in the flux conserver 14 for a desired plasma configuration. For example, the shaft power circuit 26 can be designed as a 2-stage circuit, such that in the first stage it provides a current pulse that rapidly reaches peak current and provides the pre-existing toroidal field before plasma formation, and a second stage to maintain the current flow against resistive loses (e.g. the resistive loses in the conductors). In some implementations, the shaft power circuit 26 can provide an additional shaft current pulse to increase plasma's toroidal field at pre-determined time and for pre-determined duration. For example, if the signals provided by the magnetic probes indicate increase of the poloidal field, the controller 23 can trigger the shaft current circuit to increase the shaft current. By increasing the shaft current, the toroidal field of the plasma 20 is increased, thus maintaining the ratio of the toroidal and poloidal field and keeping the plasma q-factor at the pre-determined value. Increasing of plasma poloidal field can happen for example, during plasma compression. When the compression driver 21 is triggered, it compresses the plasma 20 increasing its poloidal field thus bringing the plasma q-factor below its pre-determined value (e.g. plasma q-factor can hit rational number q=1) which may destabilize plasma magnetic field destroying plasma confinement. In order to maintain plasma stability during compression the safety factor q is maintained at a predetermined value/range by increasing the shaft current during compression. FIG. 4 shows a formation current pulse 310 and a shaft current pulse 320 with time during plasma compression. As can be noticed, shaft current is increased/ramped up (see jump 325) during the compression time period 330. The shaft current circuit can be configured to increase the shaft current pulse for at pre-determined time period until the liner 36 that moves inward compressing plasma 20 closes the outlet 13 (gap formed by the plasma propagation channel 17 at the outlet 13). Once the outlet 13 is closed, a closed current loop is formed around the plasma 20, trapping the toroidal field in the flux conserver 14, so that the toroidal field will continue increasing at the same rate as the poloidal field without any further increase of the shaft current from the shaft power supply.

Figure 5:
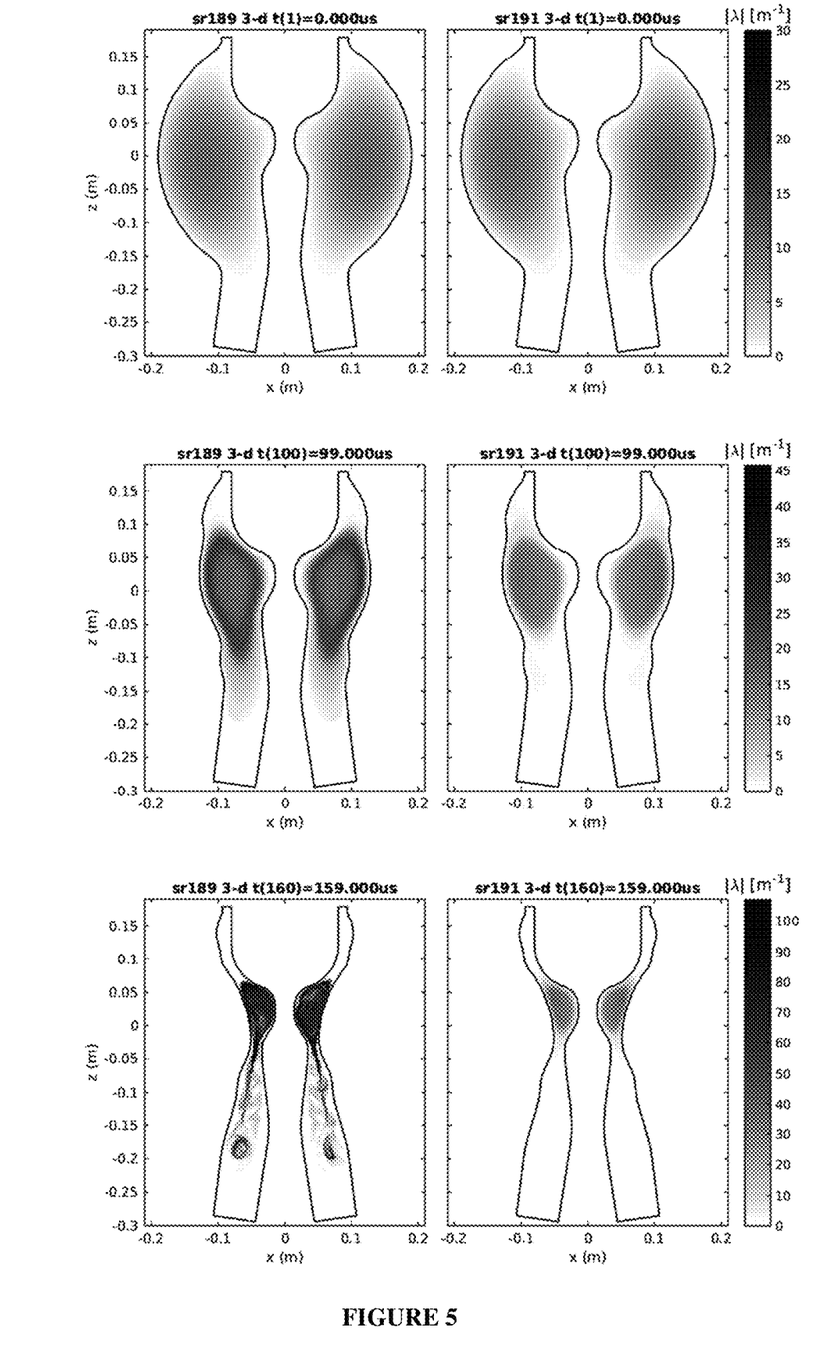
FIG. 5 left column are schematic cross-sectional views of an example of a numerical model of a plasma generation and compression system with constant shaft current pulse during compression period and right column are schematic cross-sectional views of the numerical model of a plasma generation and compression system with increased (ramped) shaft current pulse during compression period.

FIG. 5 shows examples of a numerical model of the plasma generation and compression system 10. Examples in the left column are numerical models of the system 10 and plasma's confinement and stability behavior during compression when the central shaft current pulse is maintained constant during compression period $I_{shaft}(t)=I_o$, and in the right column are models of plasma's confinement and stability behavior during compression when shaft's current increases during compression as $I_{shaft}(t) \propto 1/r_{(t)}$, where $r_{(t)}$ is radius of the plasma. As can be noticed, when shaft current is constant during compression period the magnetic field confining the plasma gets disturbed destroying the plasma confinement, while by increasing the shaft current generally proportionally with the compression ratio the plasma magnetic field is maintained stable keeping the plasma stable during compression.

Figure 6:
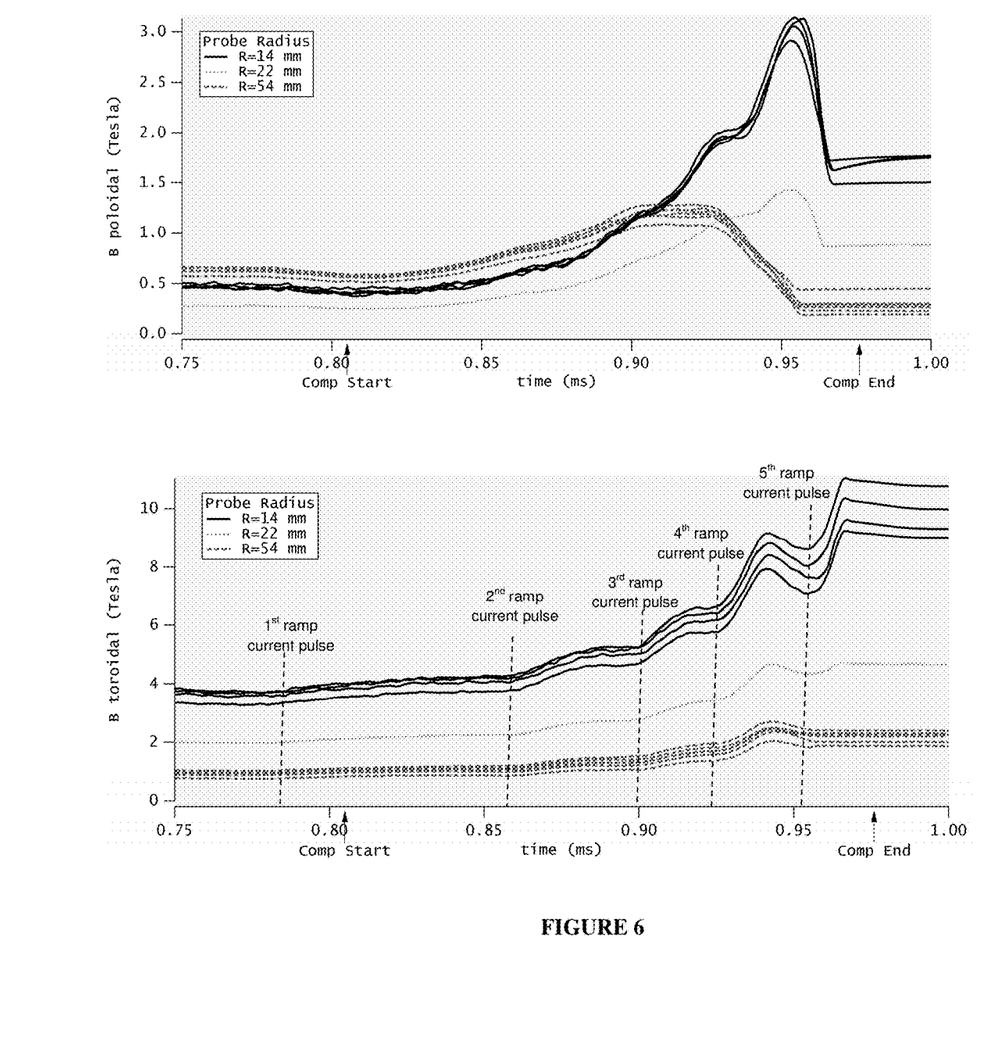
FIG. 6 upper plot is a graphical presentation of a plasma poloidal field in tesla (T) over time in microseconds (μs) and lower plot is a graphical presentation of a plasma toroidal field in tesla (T) over time in milliseconds (ms) when a shaft current pulse is increased during compression period.

FIG. 6 shows the magnetic field during one compression experiment when the shaft current was ramped up to maintain plasma's toroidal to poloidal magnetic field ratio at pre-determined range to keep plasma stable during compression. Upper plot shows plasma poloidal field while the lower plot shows plasma toroidal field for the same shot. As can be noticed the signals obtained from the magnetic probes during compression are smooth and overlapping (no oscillation) indicating a stable plasma magnetic field during compression.

Figure 7:
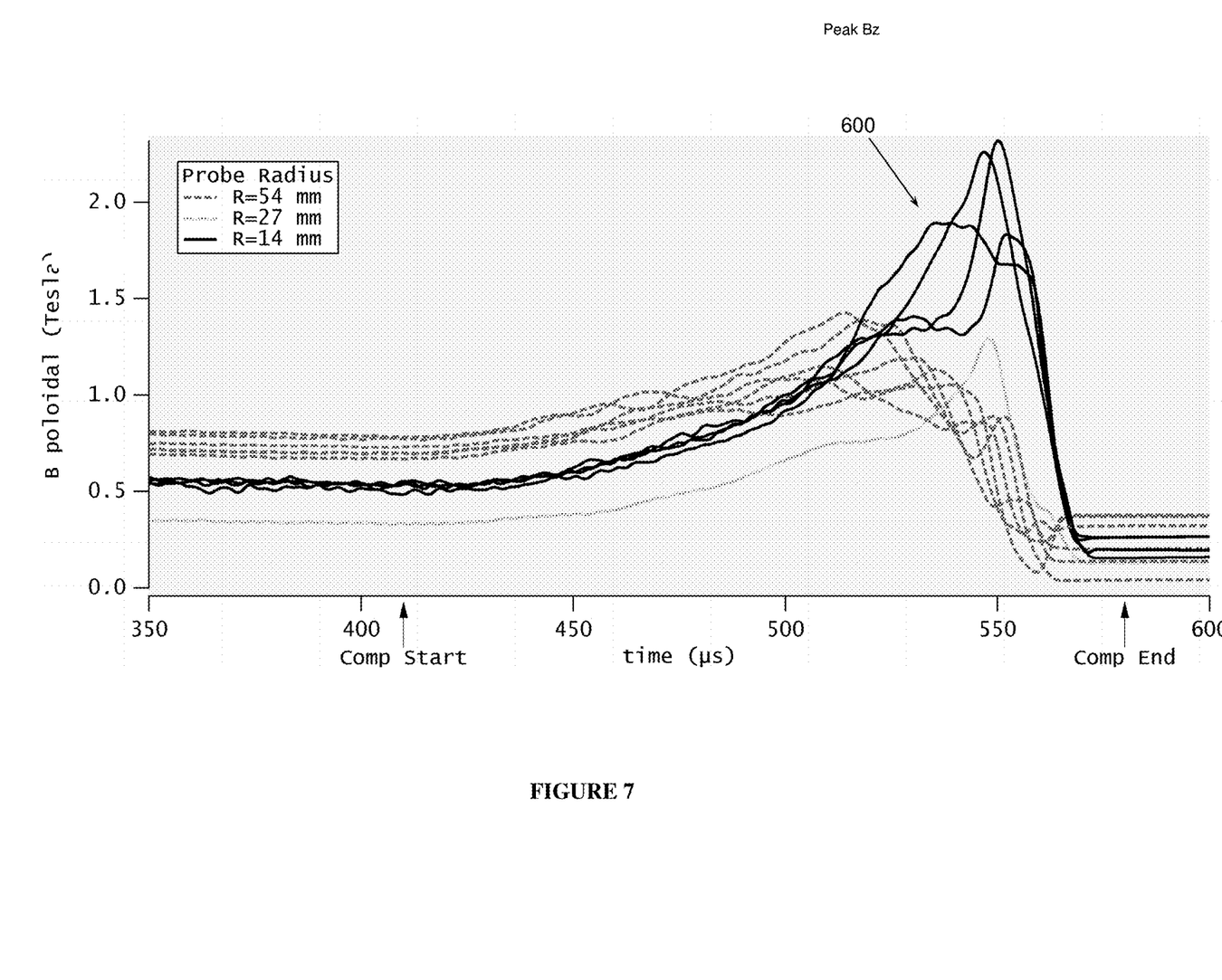
FIG. 7 is a graphical presentation of a plasma poloidal field in tesla (T) over time in microseconds (μs) when a shaft current pulse is not increased (ramped) during compression period.

FIG. 7 depicts plasma magnetic field during a compression experiment when the shaft current is not ramped up showing deviating (oscillations) magnetic field signals 600 which indicates that the plasma magnetic structure is destabilized. Thus, ramping up the shaft current during compression period keeps the plasma stable during compression.

The increase of the shaft current pulse during compression can be done actively in real time by monitoring the signals from the magnetic probes. The controller 23 can process the signals obtain from the magnetic probes in real time and when an increase in the plasma poloidal field is detected the controller can trigger the shaft power circuit to increase the shaft current pulse to match the increase of the poloidal field. In another implementation, the controller 23 can be programmed to trigger the shaft current circuit to increase the shaft current at pre-determined time based on a triggering time of the compression driver 21 and compression trajectory (e.g. trajectory of the liner 36 over time during compression). In one embodiment, the increase of the shaft current pulse can be triggered before the compression period, so that the toroidal field generated by the shaft current can diffuse into the plasma and thus match the raise in the poloidal field. For example, the additional (ramp) current pulse can be triggered 10-150 µs before the liner's wall moves inward (start of the compression). In one embodiment, the additional shaft current pulse can match the trigger time of the compression driver 21. FIG. 6 lower plot shows that the additional shaft current pulse was triggered about 10 µs ahead of the liner wall moves (start of the compression). More than one additional shaft current pulses can be provided during compression period to match the profile of the poloidal field curve and keep the plasma stable. FIG. 6 lower plot indicates that five additional shaft current pulses were triggered to keep the toroidal field increasing as the poloidal field increases due to plasma compression. However, person skilled in the art would understand that the shaft power source can be configured so that it can provide a single additional shaft pulse with a desired profile. The compression trajectory (e.g. trajectory of the liner 36) can be determined experimentally or analytically and a timing table for the shaft current circuit can be fed into controller 23 so that the additional shaft current pulse can be pre-set based on the trigger time of the compression driver 21 and the compression trajectory.

The plasma obtained in any of the disclosed embodiments can be a high energy plasma and can be suitable for applications such as, e.g., production of medical isotopes, neutron source, x-ray radiation source, nuclear fusion devices, etc. Certain embodiments of the system may be configured and operated to act as neutron generators or neutron sources. Neutrons so produced have a wide range of practical uses in research and industrial fields. For example, a neutron source can be used for neutron activation analysis (NAA) which can provide multi-element analysis of major, minor, trace, and rare elements in a variety of substances (e.g., explosives, drugs, fissile materials, poisons, etc.) and can be used in a variety of applications (e.g., explosive detection and identification, ecological monitoring of the environment or nuclear waste, etc.). Embodiments of the system configured as a neutron source can also be used for materials research (e.g., analyzing the structure, dynamics, composition, and chemical uniformity of materials), for non-destructive testing of industrial objects (e.g., via neutron radiography and/or neutron tomography), and for many other industrial and technological applications.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. A system for generating and compressing magnetized plasma comprising:
   a plasma generator for generating magnetized plasma, the plasma generator having an outlet;
   an elongated central axial shaft extending along a longitudinal axis of the system;
   a plurality of gas valves configured to inject a gas in the plasma generator;
   a flux conserver having an inner evacuated cavity and an opening in fluid communication with the outlet of the plasma generator, the central axial shaft extending out of the plasma generator into the flux conserver such that an end of the central axial shaft being in contact with the flux conserver, the generated magnetized plasma being injected into the inner cavity of the flux conserver through the outlet of the plasma generator;
   a formation power circuit configured to provide a formation power pulse to the plasma generator to ionize the injected gas and generate magnetized plasma;
   a shaft power circuit configured to provide a shaft power pulse to the central axial shaft to generate a toroidal magnetic field into the flux conserver, a duration of the shaft power pulse being longer than a duration of the formation power pulse;
   a plasma compression driver configured to compress the plasma contained in the flux conserver during a plasma compression time; and
   a controller configured to control a trigger time of the formation power circuit to provide the formation power pulse separately from the shaft power pulse,
   wherein the shaft power circuit is configured to provide at least one additional shaft current pulse to increase a plasma toroidal field during the plasma compression time to maintain a ratio of the plasma toroidal field to a plasma poloidal field at a pre-determined value during the plasma compression time,
   wherein the controller is configured to provide timing of the at least one additional shaft current pulse based on at least one of a triggering time of the plasma compression driver and a compression trajectory.

2. The system according to claim 1, wherein the at least one additional shaft current pulse is independently controlled from the formation power pulse.

3. The system of claim 2, wherein the controller is configured to provide the at least one additional shaft current pulse at a pre-determined time.

4. The system of claim 3, wherein a profile shape of the at least one additional shaft current pulse is configured to provide an increase of the plasma toroidal field that matches an increase of the plasma poloidal field during the plasma compression time.

5. The system of claim 1, wherein the at least one additional shaft current pulse comprises at least two additional shaft current pulses during the plasma compression time.

6. The system of claim 5, wherein a timing table for the shaft current pulses is provided to the controller so that the at least two additional shaft current pulses are pre-set based on a trigger time of the plasma compression driver and a compression trajectory.

7. The system according to claim 2, further comprising a plurality of probes to measure parameters of the plasma in the plasma generator and the flux conserver, the plurality of probes being in communication with the controller to provide an input signal to the controller, the controller processing the input signal and adjusting an output signal to the shaft power circuit to adjust the at least one additional shaft current pulse.

8. The system according to claim 7, wherein the controller triggers the shaft power circuit to increase shaft power pulse when increase of plasma poloidal field is detected.

9. The system of claim 1, wherein the at least one additional shaft current pulse is triggered before triggering of the plasma compression driver.

* * * * *